UNITED STATES PATENT OFFICE.

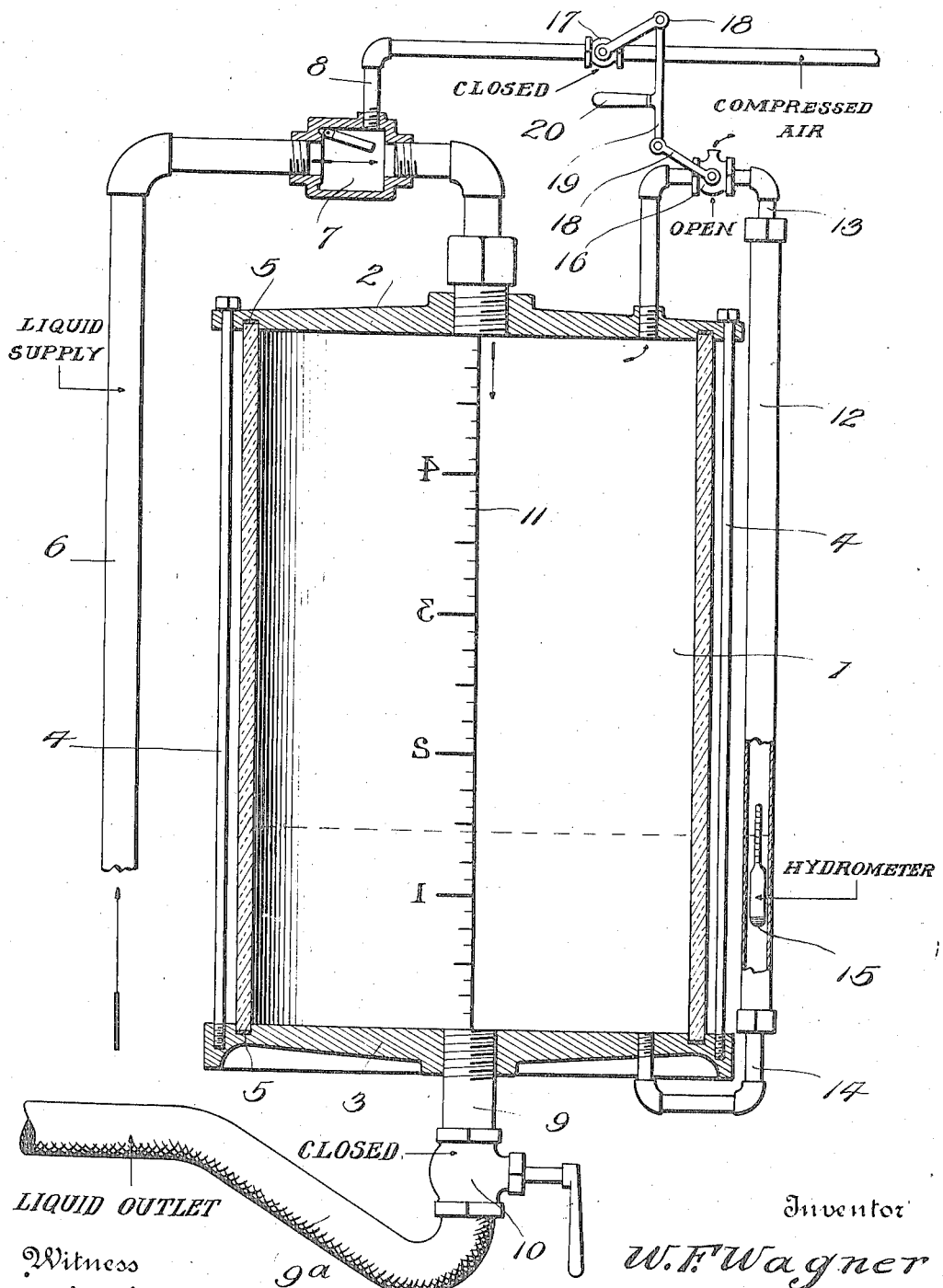

WILLIAM F. WAGNER, OF AMBRIDGE, PENNSYLVANIA, ASSIGNOR OF ONE-HALF TO JAMES W. EDMONDS, OF AMBRIDGE, PENNSYLVANIA.

LIQUID-DISPENSER.

1,249,565.  Specification of Letters Patent.  Patented Dec. 11, 1917.

Application filed October 23, 1916.  Serial No. 127,192.

*To all whom it may concern:*

Be it known that I, WILLIAM F. WAGNER, a citizen of the United States, residing at Ambridge, in the county of Beaver and State of Pennsylvania, have invented certain new and useful Improvements in Liquid-Dispensers; and I do declare the following to be a full, clear, and exact description of the invention, such as will enable others skilled in the art to which it appertains to make and use the same.

My invention has for its principal object to improve upon the construction of gasolene and other liquid dispensing apparatuses to such an extent as to permit the purchaser to ascertain exactly the amount for which he is paying.

A further object is to provide improved means for filling and emptying the measuring tank.

With the foregoing general objects in view, the invention resides in certain novel features of construction and in unique combinations of parts to be hereinafter fully described and claimed, the descriptive matter being supplemented by the accompanying drawing which constitutes a part of this specification and in which a vertical section of the improved apparatus is shown.

In the drawing the numeral 1 designates a vertically disposed glass cylinder whose ends are closed by upper and lower end plates 2 and 3 respectively secured in place by vertical stay bolts 4, packing gaskets 5 being provided for obtaining fluid tight connections. A liquid supply pipe 6 enters the upper end of the cylinder 1 and is provided with an inwardly opening check valve 7, and a compressed air supply pipe 8 enters the casing of said valve. The lower end of the cylinder is provided with a liquid discharge pipe 9 from which a hose 9ª or the like may lead if the apparatus is to be used for filling the tanks of automobiles, said pipe 9 being provided with a suitable valve 10. A graduated scale 11 is provided in order that the exact number of gallons of liquid supplied to the tank through the pipe 6 may be in full view of the purchaser.

A vertical glass tube 12 is disposed on the exterior of the tank 1 and by means of upper and lower pipe connections 13 and 14 is in communication with the interior of said cylinder or tank, the upper connections 13 serving merely as a vent to permit air to be displaced from the tube 12 as the liquid rises therein simultaneously with the raising of the level in the tank or cylinder 1. The tube 12 serves as a guideway for a common type of variable volume hydrometer 15 so that the purchaser may ascertain the exact grade of the gasolene or other liquid dispensed from the apparatus.

In order that air may escape from the cylinder or tank 1, as the liquid level rises, it is necessary to provide some suitable vent and for this purpose, a valve 16 is shown in the upper pipe connections 13. It is also essential that means be provided for cutting off the air pressure through the pipe 8 when the tank is being filled. For this purpose, a valve 17 is provided for said pipe and in view of the fact that when valve 16 is open, 17 must be closed and vice versa, I preferably provide operating connections between the two for simultaneously actuating them. The connections in question may be of any suitable construction but for illustrative purposes both valves are shown provided with operating arms 18 connected by means of a link 19 which is shown provided with an operating handle 20.

In operation, let us assume that three gallons of gasolene are to be sold. The valve 10 being closed, the handle 20 is operated to simultaneously close the valve 17 and open 16. Since the air within the tank can now escape, the liquid flowing through the pipe 6 under pressure will be deposited in the tank and when the level reaches 3 on the scale 11, the handle 20 will be operated to close 16 and open 17. The inrush of compressed air through the pipe 8, upon this operation, automatically closes the check valve 7 and when the valve 10 is now opened the passage of said air into the cylinder will quickly expel the contents thereof. It is to be observed that as the liquid rises in the tank, it maintains the same level in the tube 12, continually floating the hydrometer 15 so that the purchaser can readily see the exact grade of gasolene or other liquid.

From the foregoing, taken in connection with the accompanying drawing, it will be understood that although the device is extremely simple and comparatively inexpensive, it will be efficient and will fulfil a long felt need. I wish it understood in conclusion, however, that although certain specific details have been shown and described for illustrative purposes, numerous changes may be made within the scope of the invention as claimed. In most cases the tank 1 will be of a size to measure as high as five gallons but it is obvious that the size and shape of said tank may be varied as occasion may demand.

I claim:

A liquid dispensing apparatus comprising a measuring tank having a graduated scale, a liquid supply pipe discharging into said tank and having a check valve opening toward the same, a vent valve from the upper end of said tank to permit the escape of air while said tank is filling, a fluid pressure line discharging into said liquid supply pipe between said check valve and said tank, a cut off valve in said fluid pressure line adjacent said vent valve, a single operating handle connected operatively with said vent and cut off valves for simultaneously closing one and opening the other, and a valved outlet from the bottom of said tank.

In testimony whereof I have hereunto set my hand in the presence of two subscribing witnesses.

WILLIAM F. WAGNER.

Witnesses:
CHRISTIANA F. KNOEDLER,
FRED. KNOEDLER.